(12) United States Patent
Nishio

(10) Patent No.: US 6,673,416 B1
(45) Date of Patent: Jan. 6, 2004

(54) POLYTETRAFLUOROETHYLENE MOLD ARTICLES COATED WITH FUSED FLUOROPOLYMER RESIN

(75) Inventor: Takao Nishio, Shimizu (JP)

(73) Assignee: DuPont Mitsui Fluorochemicals, Tokyo (JP)

(*) Notice: Subject to any disclaimer, the term of this patent is extended or adjusted under 35 U.S.C. 154(b) by 0 days.

(21) Appl. No.: 09/498,215

(22) Filed: Feb. 4, 2000

(30) Foreign Application Priority Data

Feb. 9, 1999  (JP) ........................................ H11-070701

(51) Int. Cl.⁷ ........................... B32B 27/08; B32B 33/00
(52) U.S. Cl. ........................................ 428/141; 428/422
(58) Field of Search .............................. 428/36.91, 36.8, 428/141, 421, 422; 427/485, 236, 203

(56) References Cited

U.S. PATENT DOCUMENTS

| | | | | |
|---|---|---|---|---|
| 3,389,749 A | * | 6/1968 | Towns et al. ................ | 156/245 |
| 4,898,779 A | | 2/1990 | Yoshimura et al. .......... | 428/402 |
| 5,473,018 A | | 12/1995 | Namura et al. .............. | 525/200 |
| 5,494,301 A | | 2/1996 | Hamilton et al. ............ | 277/227 |
| 5,603,999 A | | 2/1997 | Namura et al. ........... | 428/36.92 |
| 5,628,786 A | | 5/1997 | Banas et al. ..................... | 623/1 |
| 5,789,047 A | | 8/1998 | Sasaki et al. ............. | 428/36.91 |

FOREIGN PATENT DOCUMENTS

EP          0 320 258          6/1989

* cited by examiner

*Primary Examiner*—Ramsey Zacharia

(57) ABSTRACT

The present invention relates to a molded article of polytetrafluoroethylene or modified polytetrafluoroethylene having a fluoropolymer resin coating, coating comprising a heat-flowable tetrafluoroethylene copolymer wherein the surface of the coated article has a reduced roughness compared to the molded article prior to coating. The coating for the molded article is preferably a fused powder, most preferably formed by electrostatically applying a fluoropolymer powder resin to the molded PTFE article. In a preferred embodiment, the fluoropolymer powder resin comprises a mixture of heat-flowable tetrafluoroethylene copolymer powder and a polytetrafluoroethylene that has a temperature of crystallization of at least 305° C. and a heat of crystallization of at least 50 J/g. The surfaces of the articles are smoother than the original articles so that they resist adhesion of chemical contaminants and have applicability for chemical containers and transport pipes in the rigorously clean environment of the semiconductor industry.

11 Claims, 2 Drawing Sheets

POLYTETRAFLUOROETHYLENE MOLD ARTICLES COATED WITH FUSED FLUOROPOLYMER RESIN

FIELD OF INVENTION

The present invention relates to molded PTFE articles for use as containers for high purity chemicals, typically in the area of semiconductor manufacturing, or as a lining material for transport pipes.

BACKGROUND OF THE INVENTION

Because of the excellent heat and chemical resistance of polytetrafluoroethylene (hereafter PTFE) and modified polytetrafluoroethylene, articles formed from these polymers are extensively used in transport pipes that handle corrosive or high temperature fluids or as corrosion resistant lining material for tanks, machines, equipment, and the like.

However, generally, the surface of PTFE molded articles is not sufficiently smooth. This is a cause for concern when such articles are used as containers for high purity chemicals or linings for transport pipes, since contaminants tend to adhere to the surface and are difficult to remove even after attempts are made to clean the articles. In particular, the removal of contaminants has become a rigorous requirement in areas requiring sophisticated physical properties, particularly in semiconductor fabrication or the like.

BRIEF SUMMARY OF THE INVENTION

The present invention provides for a molded article of polytetrafluoroethylene or modified polytetrafluoroethylene having a fluoropolymer resin coating, the coating comprising a heat-flowable tetrafluoroethylene copolymer wherein the surface of the coated article has a reduced roughness as compared to the molded article prior to coating. The coating for the molded article is preferably a fused powder, most preferably formed by electrostatically applying a fluoropolymer powder resin to the molded PTFE article. In a preferred embodiment the fluoropolymer powder resin comprises a mixture of heat-flowable tetrafluoroethylene copolymer powder and a polytetrafluoroethylene powder that has a temperature of crystallization of at least 305° C. and a heat of crystallization of at least 50 J/g.

The invention further provides for a process for forming a smooth surface on a molded article of polytetrafluoroethylene or modified polytetrafluoroethylene by coating the article with a heat-flowable fluoropolymer powder resin and heating the coated article to form a fused fluropolymer resin coating wherein the surface of the coated article has a reduced roughness compared to the molded article prior to coating.

BRIEF DESCRIPTION OF THE DRAWING(S)

DETAILED DESCRIPTION OF THE INVENTION

Figure 1:
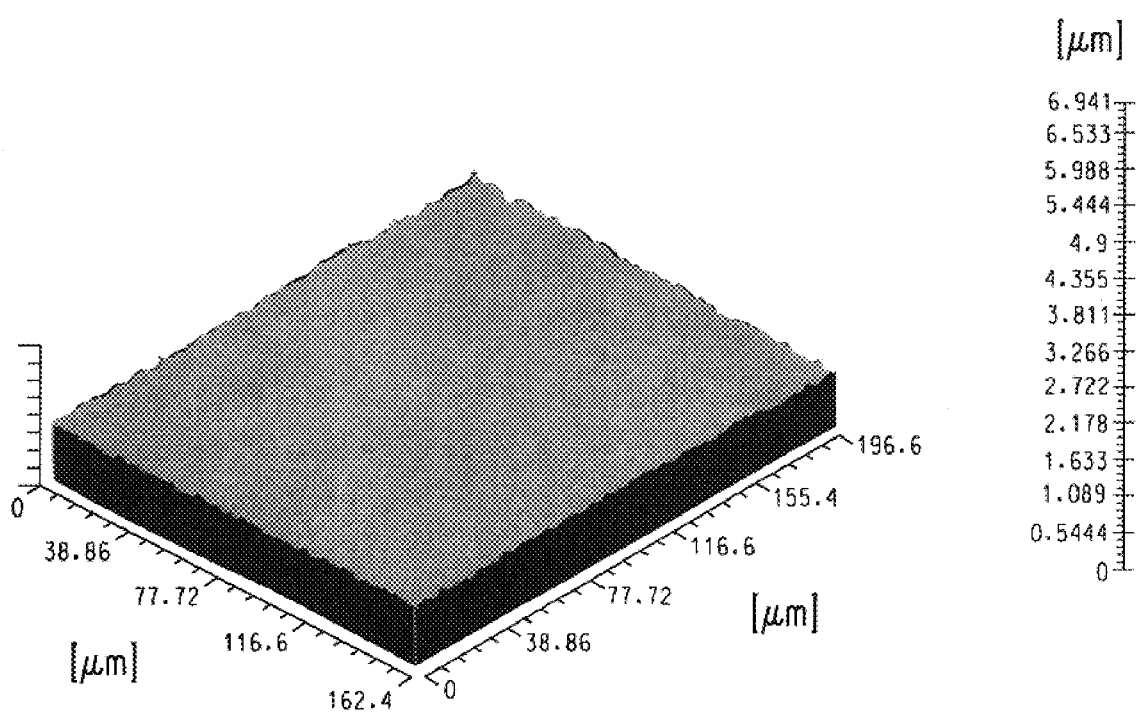
FIG. 1 is a three-dimensional profile display of the surface of a molded PTFE article (Example 3) coated with a mixture of PFA powder and low molecular weight PTFE powder in accordance with the present invention, measured using a laser type three-dimensional surface roughness measuring instrument.

PTFEs, because of their excellent characteristics such as heat resistance and chemical resistance, have been known to exhibit satisfactory performance when used as containers for high purity chemicals. Previously, they were used with no modification. However in recent years, in high technology industries, particularly, in semiconductor manufacturing areas, there is a stringent requirement for removing contaminants, so that the existing PTFE alone can no longer satisfy the requirement. The present invention satisfies the need for a molded article having the heat and chemical resistance properties of PTFE and in addition having a smoother surface that resists adhesion of contaminants to the surface. Specifically, a molded PTFE article with a smoother surface can be prepared by electrostatically powder coating the surface of a PTFE molded article with a fluoropolymer powder resin. The fluoropolymer powder resin comprises a heat-flowable tetrafluoroethylene copolymer. Preparation of an article with this electrostatic coating permits the entire surface of the article, regardless of configuration, to be covered with heat-flowable fluoropolymer powder resin, thereby considerably improving the surface smoothness of the molded polytetrafluoroethylene article.

By smoother surface is meant that the surface of the coated article has a reduced roughness as compared to a molded article prior to coating.

% Reduced Roughness is calculated by the following equation (1):

$$\text{Surface Roughness (uncoated article)} - \text{Surface Roughness (coated article)}/\text{Surface Roughness (uncoated article)} \times 100 \quad (1)$$

The coated articles of the present invention preferably have a surface roughness that is reduced by at least 25%, more preferably by at least 50% and most preferably by at least 75% as compared to a molded article prior to coating. The coated surface of the molded articles of this invention have a center line average roughness ($R_a$) of less than 1.5 micrometers, preferably less than 1.0 micrometer, and most preferably less than 0.5 micrometer.

Molded PTFE

PTFE molded articles, substrates in this invention, are molded articles obtained by molding tetrafluoroethylene homopolymer (PTFE) or modified polytetrafluoroethylene. By modified PTFE is meant that PTFE contains a small amount of comonomer modifier which improves film-forming capability during baking (fusing), such as perfluoroolefin, notably hexafluoropropylene (HFP) or perfluoro(alkyl vinyl ether), notably wherein the alkyl group contains 1 to 5 carbon atoms, with perfluoro(propyl vinyl ether) (PPVE) being preferred or fluoroalkyl ethylene or chlorotrifluoroethylene. The amount of such modifier will be insufficient to confer melt-fabricability to the PTFE, generally being no more than 1 wt %. The PTFE, also for simplicity, can have a single melt viscosity, usually at least $1 \times 10_9$ Pa·s, but a mixture of PTFEs having different melt viscosities can be used to form the molded fluoropolymer component.

Heat-Flowable Fluoropolymer

Heat-flowable fluoropolymer resins that can be used in this invention are copolymers of tetrafluoroethylene and other comonomers that melt and liquify to flow at temperatures above their melting points. Examples of such copolymers include copolymers of tetrafluoroethylene and perfluoro(alkyl vinyl ether) (PFA) such as perfluoro(propyl vinyl ether), and copolymers of tetrafluoroethylene and hexafluoropropylene (FEP). "Heat-flowable" as used herein means that the fluoropolymer resin means that particles of the fluororesin will flow and fuse together upon heating above their melting temperature.

Preferred among the heat-flowable fluoropolymer resins that coat the surface of PTFE molded articles, is PFA powder that is a crystalline copolymer powder of tetrafluoroethylene and perfluoro(alkyl vinyl ether), the copolymer powder having a perfluoro(alkyl vinyl ether) content in the copolymer of 1–10% by weight. Suitable perfluoro(alkyl vinyl ether) comonomers are perfluoro(propyl vinyl ether), perfluoro(ethyl vinyl ether), and perfluoro(methyl vinyl ether).

The copolymer powder is a heat-flowable fluoropolymer resin that permits melt molding such as melt extrusion molding, injection molding and the like, and preferably has a melt flow rate (MFR) at 372° C.±1° C. of 0.5–500 g/10 minutes, more preferably 0.5–50 g/10 minutes.

Another useful heat-flowable fluoropolymer resin is FEP powder, which is a copolymer powder of tetrafluoroethylene and hexafluoropropylene where the hexafluoropropylene content in the copolymer is 10–15% by weight of the copolymer powder. This copolymer powder is a heat-flowable fluoropolymer resin that permits melt molding such as melt extrusion molding, injection molding, or the like.

Low Molecular Weight PTFE

The above copolymer powders e.g., PFA or FEP can be used alone, but the use of a mixture with a specific low molecular weight PTFE can further improve surface smoothness. Such a PFA powder that is most suitable for the objectives of the invention is a mixture of a PFA powder and a polytetrafluoroethylene powder having a temperature of crystallization of at least 305° C. and a heat of crystallization of at least 50 J/g. The average particle size of low molecular weight PTFE is less than 100 micrometers, and preferably 2–20 micrometers. A PFA composition containing low molecular weight PTFE for use as a molding composition is previously described in U.S. Pat. Nos. 5,473,018 and 5,603,999. Alternatively, the low molecular weight PTFE may be added in the form of dispersion wherein the average particle size is 0.05 micrometer to 1 micrometer.

Use of a conventional PTFE having physical properties other than the low molecular weight PTFE described above as a component will make it difficult to achieve a smooth coating onto a substrate material by electrostatic coating, failing to give a PTFE molded article with excellent surface smoothness. In the above composition, the amount of PTFE to be incorporated is 0.01–50% by weight, particularly 0.01–4% by weight with respect to the composition. Using too little PTFE reduces the effect of improving surface smoothness, while using a level exceeding 50% by weight produces a poor coating onto the substrate.

Electrostatic Powder Coating Procedure

The present invention calls for electrostatically powder coating the surface of a PTFE molded article substrate with a heat-flowable fluoropolymer resin e.g., PFA powder or an FEP powder for improved surface smoothness. PTFE molded articles, because of their excellent water repellency and oil repellency features, are difficult to surface-coat. It is extremely difficult to coat the surface of a PTFE molded article with PFA or FEP by an impregnation coating or similar techniques. Also, there are limitations on the available configurations of coatable PTFE molded articles even when the PTFE molded article is pretreated to make the surface of the molded article more receptive to the coating. However, it has been discovered that use of electrostatic coating of a heat-flowable fluoropolymer powder resin, e.g., PFA powder or FEP powder, readily provides an excellent coating and removes previous limitations with respect to the configuration of the PTFE molded article to be coated. Electrostatically powder coating using a PFA powder or a FEP powder permits controlling the thickness of the film generated on the surface of a PTFE molded article, making it possible to provide a film thickness of 100 $\mu$m or below. Thin films can produce a smooth surface on large articles of molded PTFE. The use of thin film coatings permits economic fabrication of large articles producing surfaces that can resist adhesion of contaminants.

There are no particular limitations as to the method of electrostatically powder coating the surface of a PTFE molded article with a heat-flowable fluropolymer resin. Use of any conventional electrostatic powder coating method/equipment is suitable for the application of the powder to produce smooth, coated, molded PTFE articles of this invention.

A PTFE molded article of this invention, obtained by coating the surface with a heat-flowable fluoropolymer resin retains the excellent physical properties of fluororesins, such as heat resistance and chemical resistance, while exhibiting excellent surface smoothness. The surface smoothness of the article substantially suppresses contamination in fluid handling equipment and therefore may be adapted to a broad range of applications in the area of precision industry materials such as in semiconductor processing areas.

TEST METHODS

Temperature of Crystallization

A Perkin Elmer differential scanning calorimeter DSC Model 7 is used to determine Temperature of Crystallization. A 5 mg sample is weighed in a dedicated aluminum pan, crimped by means of a dedicated crimper, mounted in a DSC instrument, and the sample is heated from 200° C. to 380° C. at 10°C./min. After the sample is held one minute at 380° C., it is cooled from 380° C. to 200° C. at 10°C./min, producing a crystallization curve from which the crystallization peak temperature is obtained as the temperature of crystallization (Tc).

Heat of Crystallization

The heat of crystallization (Hc) is obtained from the crystallization curve by connecting with a straight line the point where the curve departs from the base line to the point at which the curve returns to the base line before and after a given crystallization peak and measuring the peak area enclosed.

Surface Roughness

The center line average roughness (Ra) of the surface of PTFE molded articles is measured using a laser type three-dimensional surface roughness measurement instrument (manufactured by Laser Tex, Model 1LM21).

EXAMPLES

The present invention is now more specifically described using the examples below. The compositions, physical properties, and manufacturing processes and the like, of the fluoropolymer resins used as substrates and as coatings in these examples and comparative examples are given below.

Fluoropolymer Resins (1) PTFE Powder:

Average Particle Size 30 μm

"Teflon 170-J" (Registered trademark, Mitsui DuPont Fluorochemicals KK)

(2) PFA Powder:

Average Particle Size 28 μm

Manufactured by Mitsui DuPont Fluorochemicals KK

Copolymer of tetrafluoroethylene and perfluoro(propyl vinyl ether) (PFA)

[perfluoro(propyl vinyl ether) content 3.6 wt %]

(3) FEP Powder:

Average Particle Size 32 μm

Manufactured by Mitsui DuPont Fluorochemicals KK

Copolymer of tetrafluoroethylene and hexafluoropropylene (FEP)

[hexafluoropropylene content 12.0 wt %]

(4) Low Molecular Weight PTFE Powder

Average Particle Size 2–20 μm

Temperature of Crystallization 305° C. or higher

Heat of Crystallization 50 J/g or higher.

PTFE Molded Article

PTFE molded articles are formed by filling a mold, 170 mm long×170 mm wide×15 mm thick with 350 g of PTFE powder (1) and compressing at a pressure of 150 kg/cm$^2$ and a compression speed of 10 mm/min until a thickness of 4 mm is reached. After having reached the desired thickness, the pressure is held 1 minute at 150 kg/cm$^2$, followed by deaerating to give a PTFE pre-molded article.

The resulting PTFE pre-form molded article is placed on a metal plate and sintered according to the following temperature cycle.

(i) Heating from room temperature to 370° C. in 2 hours.

(ii) Holding at 370° C. for 1 hour.

(iii) Cooling from 370° C. to 100°C. at the rate of –30° C./hr.

(iv) On reaching 100° C., the sample is removed from the oven and cooled to room temperature.

A PTFE molded article (sheet), 170 mm×170 mm×4 mm thick comprising 350 g of

PTFE Powder is Produced.

Examples 1 and 2

A heat-flowable fluoropolymer resin of PFA (2) or FEP (3) powder, as indicated in Table 1, is electrostatically spray coated onto a molded PTFE sheet prepared as described above. The sheet is grounded, 25cm away. Coating is conducted at an electrical voltage of 10 kV (negative) and a rate of discharge of 50 mg/min using an electrostatic powder coater (manufactured by Onoda Cement KK; GX-200T) and an electrostatic powder coating gun (Onoda Cement KK GX-107). The applied powder weight is uniformly 2.2 g, thereby generating a 100 μm coated thickness after sintering. The coating environment is at a temperature 25° C. and a moisture level of 60% RH. The coated PTFE sheet is sintered in a forced air circulation oven at 370° C. for 30 minutes and then cooled to room temperature producing a molded PTFE article coated with fused fluoropolymer resin of heat-flowable PFA or FEP.

The center line average roughness (Ra) of the surface of the resulting fused fluoropolymer coated PTFE sheet is measured using a laser type three dimensional surface roughness measurement instrument and the results are shown in Table 1.

Example 3

A molded PTFE sheet prepared as described above is electrostatically powder coated in a manner similar to that of Example 1. However, in this example the powder is a mixture of 99% by weight of the PFA powder (2) and 1% of a low molecular weight PTFE powder (4) having a temperature of crystallization of at least 305° C. and heat of crystallization of at least 50 J/g, thereby obtaining a fused fluoropolymer resin coated PTFE sheet.

Center line average roughness of the surface of the resultant PTFE sheet coated with a PFA containing a low molecular weight PTFE is measured using a laser type three dimensional surface roughness measurement instrument. The results are given in Table 1. A three-dimensional profile obtained using this apparatus is shown in FIG. 1.

Comparative Example 1

Figure 2:
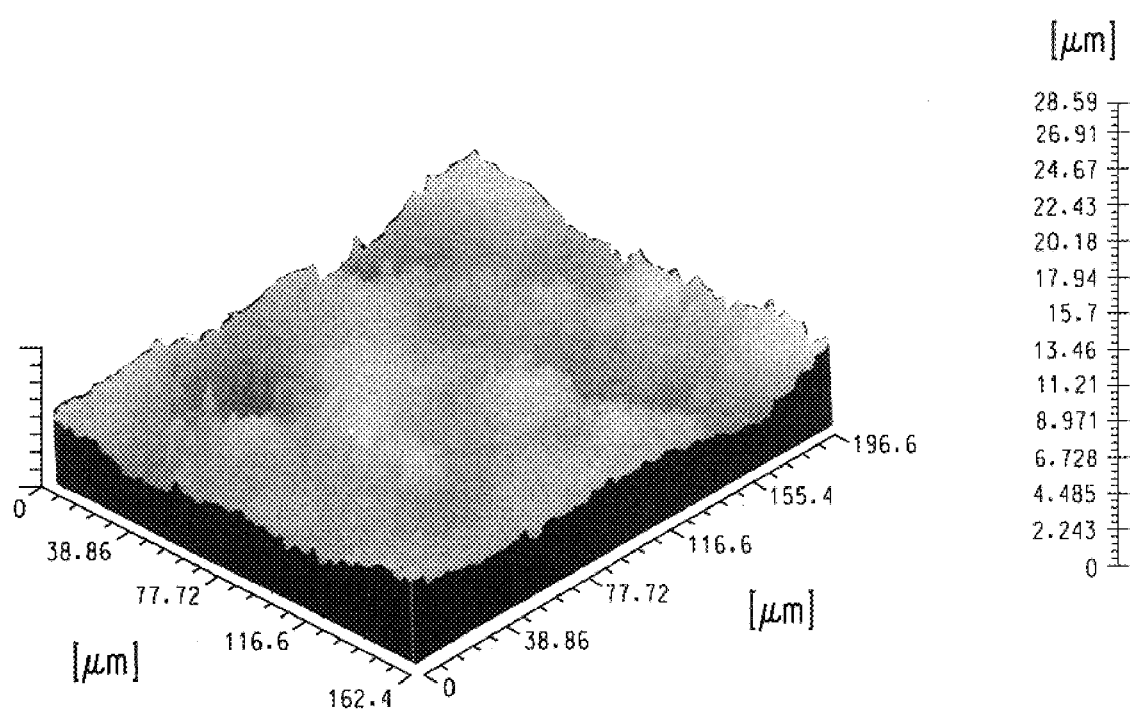
FIG. 2 is a three-dimensional profile display of the surface of a molded PTFE article (Comparative Example 1) without a heat-flowable coating measured using a laser type three-dimensional surface roughness measuring instrument.

A molded PTFE sheet prepared as described above but not having a fused fluoropolymer powder resin coating, e.g., without any modification, is subjected to measurement of its surface center line average roughness (Ra) using a laser type three dimensional surface roughness measurement instrument. The results are given in Table 1. A three-dimensional profile obtained using this apparatus is also given in FIG. 2.

TABLE 1

|  | Example 1 | Example 2 | Example 3 | Comp. Ex. 1 |
| --- | --- | --- | --- | --- |
| Substrate Material | PTFE Molded article | PTFE Molded article | PTFE Molded article | PTFE Molded article |
| Fluoropolymer resin Powder |  |  |  |  |
| PFA (wt %) | 100 | — | 99 | — |
| FEP (wt %) | — | 100 | — | — |
| Low molecular wt PTFE (wt %) | — | — | 1 | — |
| Method of coating | Electrostatic powder coating | Electrostatic powder coating | Electrostatic powder coating | — |
| Center line average roughness (μm) | 0.33 | 0.25 | 0.21 | 2.15 |

The results of Table 1 (FIGS. 1 and 2) clearly show that in contrast to the surface of the unmodified PTFE molded articles having rough surfaces with indentations and protrusions, the fused fluoropolymer resin coated PTFE molded articles of this invention exhibit substantially improved surface smoothness. The coated molded articles of Examples 1, 2 and 3 with average surface roughness of 0.33, 0.25 and 0.21 respectively have a roughness that is reduced by 85%, 88% and 90% respectively as compared to the molded article with no coating of Comparative Example 1.

What is claimed is:

1. A compression molded, sintered article having a substrate consisting essentially of non-melt-fabricable polytetrafluoroethylene or modified polytetrafluoroethylene, said article having a fluoropolymer resin coating, said coating comprising a fused powder of heat-flowable tetrafluoroethylene copolymer, wherein the surface of the coated article has a reduced roughness compared to the molded article prior to coating.

2. The article of claim 1 wherein said fluoropolymer resin coating comprises a copolymer of tetrafluoroethylene and perfluoro(alkyl vinyl ether) (PFA).

3. The article of claim 1 wherein said fluoropolymer resin coating comprises a copolymer of tetrafluoroethylene and hexafluoropropylene (FEP).

4. The article of claim 1 wherein said fluoropolymer resin coating comprises a mixture of heat-flowable tetrafluoroethylene copolymer and a polytetrafluoroethylene that has a temperature of crystallization of at least 305° C. and a heat of crystallization of at least 50 J/g.

5. The molded article of claim 1 wherein the surface of the coated article has a roughness that is reduced by at least 25% as compared to the molded article prior to coating.

6. The molded article of claim 1 wherein the surface of the coated article has a roughness that is reduced by at least 50% as compared to the molded article prior to coating.

7. The molded article of claim 1 wherein the surface of the coated article has a roughness that is reduced by at least 75% compared to the molded article prior to coating.

8. The molded article of claim 1 wherein the coated surface has a center line average roughness ($R_a$) of less than 1.5 micrometers.

9. The molded article of claim 1 wherein the coated surface has a center line average roughness ($R_a$) of less than 1.0 micrometer.

10. The molded article of claim 1 wherein the coated surface has a center line average roughness ($R_a$) of less than 0.5 micrometer.

11. The article of claim 1 wherein said coating is formed by electrostatically applying said tetrafluoroethylene copolymer powder to said molded PTFE article.

* * * * *